US012610168B1

(12) United States Patent
Wan

(10) Patent No.: US 12,610,168 B1
(45) Date of Patent: Apr. 21, 2026

(54) SWIMMING POOL FOUNTAIN SPEAKER

(71) Applicant: SHENZHEN HAIKE INNOVATION ELECTRONICS CO., LTD., Shenzhen (CN)

(72) Inventor: Gangbin Wan, Deyang (CN)

(73) Assignee: SHENZHEN HAIKE INNOVATION ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 19/304,840

(22) Filed: Aug. 20, 2025

(30) Foreign Application Priority Data

Aug. 5, 2025 (CN) ........................ 202521648422.X

(51) Int. Cl.
*H04R 1/02* (2006.01)

(52) U.S. Cl.
CPC ......... *H04R 1/028* (2013.01); *H04R 2420/07* (2013.01)

(58) Field of Classification Search
CPC ............................ H04R 1/025; H04R 2420/07
See application file for complete search history.

(56) References Cited

FOREIGN PATENT DOCUMENTS

| | | | | |
|---|---|---|---|---|
| CN | 120139552 A * | 6/2025 | ................ | C02F 1/44 |
| WO | WO-2022165626 A1 * | 8/2022 | ............... | H04R 1/02 |

* cited by examiner

*Primary Examiner* — Sunita Joshi

(57) ABSTRACT

A swimming pool fountain speaker includes an outer housing, a sound-producing device, a power supply system, and a control circuit board. The outer housing is configured for floating on the water surface. The sound-producing device is arranged in the outer housing, and the sound-producing device is configured for playing audio. The power supply system is configured for supplying power to the sound-producing device. The control circuit board is electrically connected to the sound-producing device. The control circuit board includes a wireless communication module. The control circuit board is configured for receiving a wireless signal via the wireless communication module, and the control circuit board is configured for controlling the sound-producing device to play audio.

17 Claims, 12 Drawing Sheets

SWIMMING POOL FOUNTAIN SPEAKER

CROSS-REFERENCE TO RELATED APPLICATIONS

The application claims priority of Chinese patent application CN202521648422X, filed on Aug. 5, 2025, which is incorporated herein by reference in its entirety.

TECHNICAL FIELD

The present invention relates to the field of sound-producing device, in particular to a swimming pool fountain speaker.

BACKGROUND ART

Along with the enhancement of environmental awareness and the increase of urban traffic pressure, swimming pool fountain speakers have emerged and become popular due to features of environmental protection and convenience. At present, most of the swimming pool fountain speakers on the market use sound-producing devices without wireless function. This requires users to manually touch the sound-producing devices to switch music, which is very troublesome. Moreover, most of the swimming pool fountain speakers on the market are not equipped with lighting function and water spraying function, the function is single, and the playability is insufficient. Therefore, the present invention provides a swimming pool fountain speaker, which can effectively solve the above problems.

SUMMARY

In order to overcome the shortcomings of the prior art, the present invention provides a swimming pool fountain speaker.

The swimming pool fountain speaker includes an outer housing, and the outer housing is configured for floating on the water surface.

The swimming pool fountain speaker further includes a sound-producing device. The sound-producing device is arranged in the outer housing, and the sound-producing device is configured for playing audio.

The swimming pool fountain speaker further includes a power supply system and a control circuit board. The power supply system is electrically connected to the control circuit board, and the power supply system is configured for supplying power to the sound-producing device. The control circuit board is electrically connected to the sound-producing device. The control circuit board includes a wireless communication module, and the control circuit board is configured for receiving a wireless signal via the wireless communication module. Moreover, the control circuit board is configured for controlling the sound-producing device to play audio according to the received wireless signal.

Furthermore, the outer housing includes a first housing and a second housing, and the first housing is connected to the second housing. The second housing is configured for floating in the water. The swimming pool fountain speaker further includes an inner housing and a bracket, and the inner housing is arranged in the outer housing. The inner housing is respectively connected to the first housing and the second housing. Thus, an accommodating cavity is formed by the inner housing and the second housing. The sound-producing device and the power supply system are arranged in the accommodating cavity. The bracket is arranged on the inner housing, and the sound-producing device is arranged on the bracket.

Furthermore, the inner housing includes a first slot, and the second housing includes a first connection portion. The first connection portion is configured to be arranged in the first slot, so that the second housing is connected to the inner housing. The first slot is provided with a first sealing member. The first connection portion is engaged in the first slot and is configured for compressing the first sealing member, so as to form the sealed accommodating cavity.

Furthermore, the second housing further includes a second slot, and the inner housing further includes a second connection portion. The second connection portion is configured to be arranged in the second slot, so that the second housing is connected to the inner housing. The second slot is provided with a second sealing member, and the second connection portion is engaged in the second slot and is configured for compressing the second sealing member, so as to form the sealed accommodating cavity.

Furthermore, the first housing includes a plurality of sound holes, and the sound-producing device is arranged corresponding to the sound hole. The bracket includes a first mounting hole, and a lower end of the sound-producing device comprises a protrusion. The protrusion is configured to be arranged in the first mounting hole, so that the sound-producing device is arranged on the bracket. The inner housing further includes a second mounting hole, and the sound-producing device is arranged corresponding to the second mounting hole.

Furthermore, the inner housing further includes a third slot, and the sound-producing device further includes a third connection portion. The third connection portion is configured to be arranged in the third slot, so that the sound-producing device is connected to the inner housing.

Furthermore, the sound-producing device further includes a diaphragm, and the diaphragm is arranged on a surface of the sound-producing device.

Furthermore, the outer housing includes a first housing, a second housing and an inner housing, and an accommodating cavity is formed by the inner housing and the second housing. The outer housing further includes a water spray channel extending from top to bottom and a plurality of water outlets. The water spray channel is in communication with the water outlets. The swimming pool fountain speaker further includes a pump body, and the power supply system is electrically connected to the pump body. The pump body, the water spray channel and the water outlets are connected in sequence. The pump body is configured for ejecting the water from the water outlets after the water is pumped into the water spray channel by the pump body and flows through the water spray channel. A diameter of the water outlet is smaller than a diameter of the water spray channel, so that the water in the water spray channel obtains bigger water pressure when being ejected from the water outlets, thereby obtaining a bigger spray height. The accommodating cavity is arranged around the water spray channel.

Furthermore, the outer housing further includes a nozzle, and the plurality of water outlets are arranged around the nozzle. The first housing includes a third mounting hole, and the nozzle is arranged in the third mounting hole and is connected to the inner housing. The second housing includes an installation slot, and the pump body is arranged in the installation slot.

Furthermore, the nozzle includes a fourth slot, and the inner housing further includes a fourth connection portion. The fourth connection portion is configured to be arranged in the fourth slot, so that the inner housing is connected to the fourth slot. A third sealing member is arranged between the inner housing and the nozzle. The fourth connection portion is engaged in the fourth slot and is configured for compressing the third sealing member, so as to seal a gap between the nozzle and the inner housing.

Furthermore, a water spray channel includes a first channel, a second channel and a third channel. The first channel is defined in the second housing, and the first channel is in communication with the installation slot.

Furthermore, the second channel is defined in the inner housing, and the second channel is connected to and is in communication with the first channel. The second connection portion is defined in the second channel, and the second slot is defined in the first channel. The second sealing member is configured for sealing the gap between the second channel and the first channel, so that the accommodating cavity is divided from the first channel and the second channel.

Furthermore, the outer housing further includes a third housing, and the third housing is connected to the nozzle. The third housing is arranged in the second channel. A gap is positioned between the third housing and an inner wall of the second channel of the inner housing, so that a third channel is formed between the third housing and the inner wall of the second channel. The third channel is arranged around the third housing, and the third channel is in communication with the water outlets. A diameter of the third channel is smaller than a diameter of the second channel.

Furthermore, the pump body is provided with a first working mode and a second working mode. When the pump body is in the first working mode, a power of the pump body is a first power, and a spray height of the water outlet is a first spray height. When the pump body is in the second working mode, the power of the pump body is a second power, and the spray height of the water outlet is a second spray height. The second spray height is greater than the first spray height.

Furthermore, the pump body is further provided with a third working mode. When the pump body is in the third working mode, the sound-producing device generates an audio signal while playing audio. The audio signal is transmitted to the control circuit board. The control circuit board is configured for controlling the power of the pump body to change in accordance with the audio signal according to the received audio signal, so that the spray height of the water outlet changes in accordance with the audio signal.

Furthermore, the outer housing includes a first housing, a second housing and an inner housing. The swimming pool fountain speaker further includes a lighting device. The lighting device is electrically connected to the power supply system, and the lighting device is arranged in the outer housing. The lighting device is capable of emitting multiple colorful lights. The sound-producing device is configured for emitting sound while playing audio. The control circuit board is configured for controlling the lighting device to flash in accordance with the audio signal according to the received audio signal.

Furthermore, the lighting device includes a first lamp group and a second lamp group. The first lamp group is arranged downwards, and the second lamp group is arranged upwards. The second housing is made of light pervious material. The first housing further includes a fourth mounting hole, and the inner housing further includes a protruding lampshade. The lampshade is arranged in the fourth mounting hole, and the second lamp group is arranged corresponding to the lampshade.

Furthermore, the swimming pool fountain speaker further includes a partition plate, and the partition plate is connected to the inner housing. The lighting device and the power supply system are arranged on the partition plate. The partition plate includes a plurality of lamp holes, and positions of the lamp holes correspond to a position of the first lamp group. The power supply system includes a battery, a control button and a charging port. The control circuit board is electrically connected to the control button, the charging port, the battery and the pump body respectively. The control button includes a silicone sleeve. The swimming pool fountain speaker further includes a water sensing device, and the water sensing device is arranged at a bottom portion of the swimming pool fountain speaker. The water sensing device is electrically connected to the control circuit board. The charging port includes a waterproof plug.

The present invention further provides a swimming pool fountain speaker.

The swimming pool fountain speaker includes an outer housing, the outer housing is configured for floating on the water surface, and the outer housing comprises a water outlet.

The swimming pool fountain speaker further includes a sound-producing device, and the sound-producing device is arranged in the outer housing. The sound-producing device is configured for playing audio.

The swimming pool fountain speaker further includes a pump body, a power supply system and a control circuit board. The power supply system is electrically connected to the control circuit board. The power supply system is configured for supplying power to the sound-producing device and the pump body. The pump body is configured for pumping water into the swimming pool fountain speaker and discharging water from the water outlet.

The control circuit board is electrically connected to the sound-producing device. The control circuit board includes a wireless communication module. The control circuit board is configured for receiving a wireless signal via the wireless communication module. Moreover, the control circuit board is configured for controlling the sound-producing device to play audio according to the received wireless signal.

The present invention further provides a swimming pool fountain speaker.

The swimming pool fountain speaker includes an outer housing, and the outer housing is configured for floating on the water surface.

The swimming pool fountain speaker further includes a sound-producing device, and the sound-producing device is arranged in the outer housing. The sound-producing device is configured for playing audio.

The swimming pool fountain speaker further includes a power supply system, a lighting device and a control circuit board. The power supply system is electrically connected to the control circuit board. The power supply system is configured for supplying power to the sound-producing device and the lighting device. The lighting device is configured for transmitting the emitted light to the outside through the outer housing.

The control circuit board is electrically connected to the sound-producing device. The control circuit board includes a wireless communication module. The control circuit board is configured for receiving a wireless signal via the wireless communication module. Moreover, and the control circuit board is configured for controlling the sound-producing device to play audio according to the received wireless signal.

Beneficial effects of the present invention are as follows. The present invention provides a swimming pool fountain speaker. The swimming pool fountain speaker can play music and is provided with a water spraying function. Moreover, the water spraying function of the swimming pool fountain speaker can be adjusted in three levels. The swimming pool fountain speaker has lighting effects, the light dynamically synchronizes with the musical rhythm, and the light can be adjusted in multiple colors. The functions mentioned above provide more interest and ornamental value for users. The users can control the swimming pool fountain speaker to play music through a wireless connection, thereby providing great convenience for the users.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
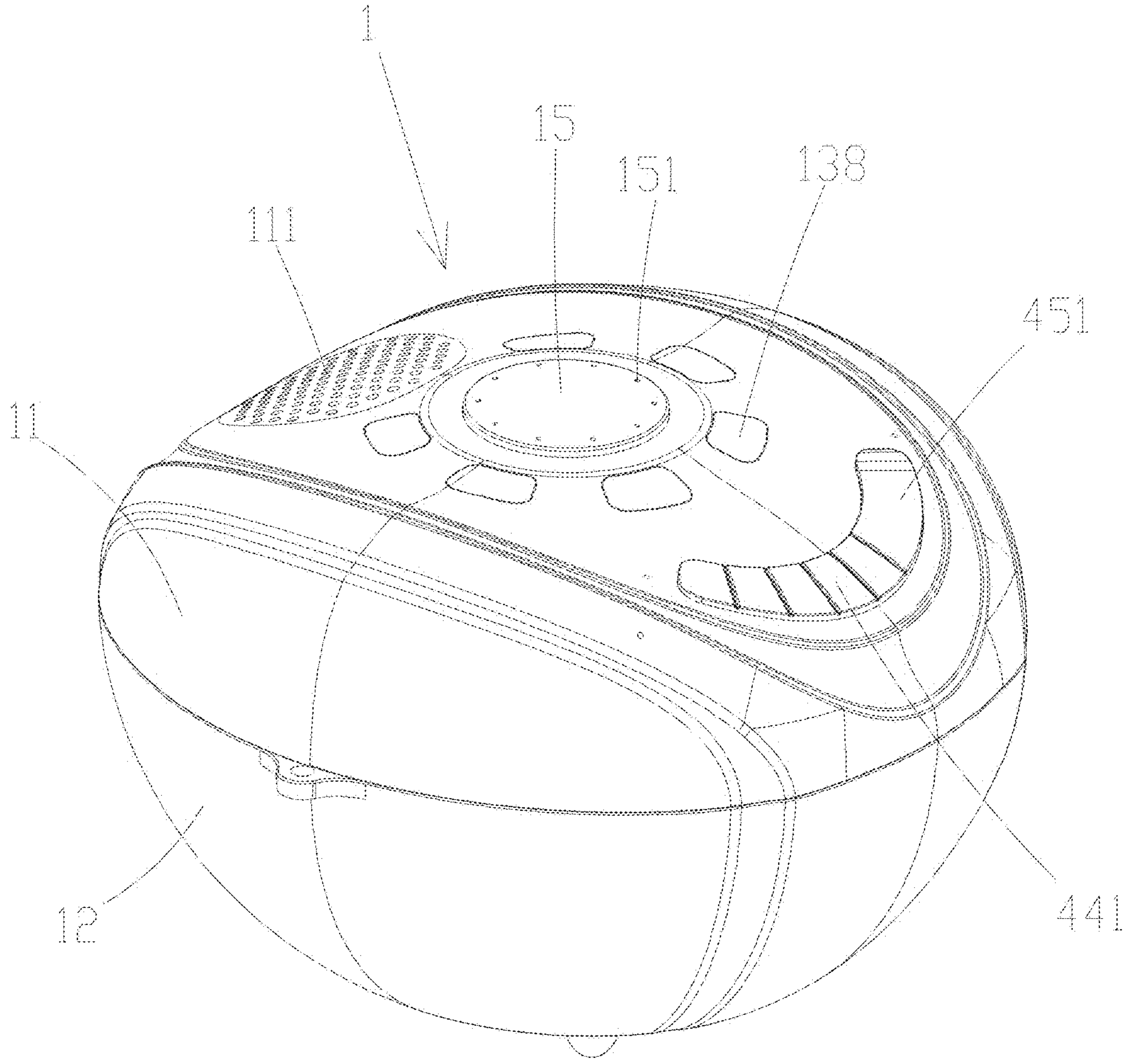
FIG. 1 is a perspective view of the embodiment 1, embodiment 2 and embodiment 3 of the present invention.
Figure 2:
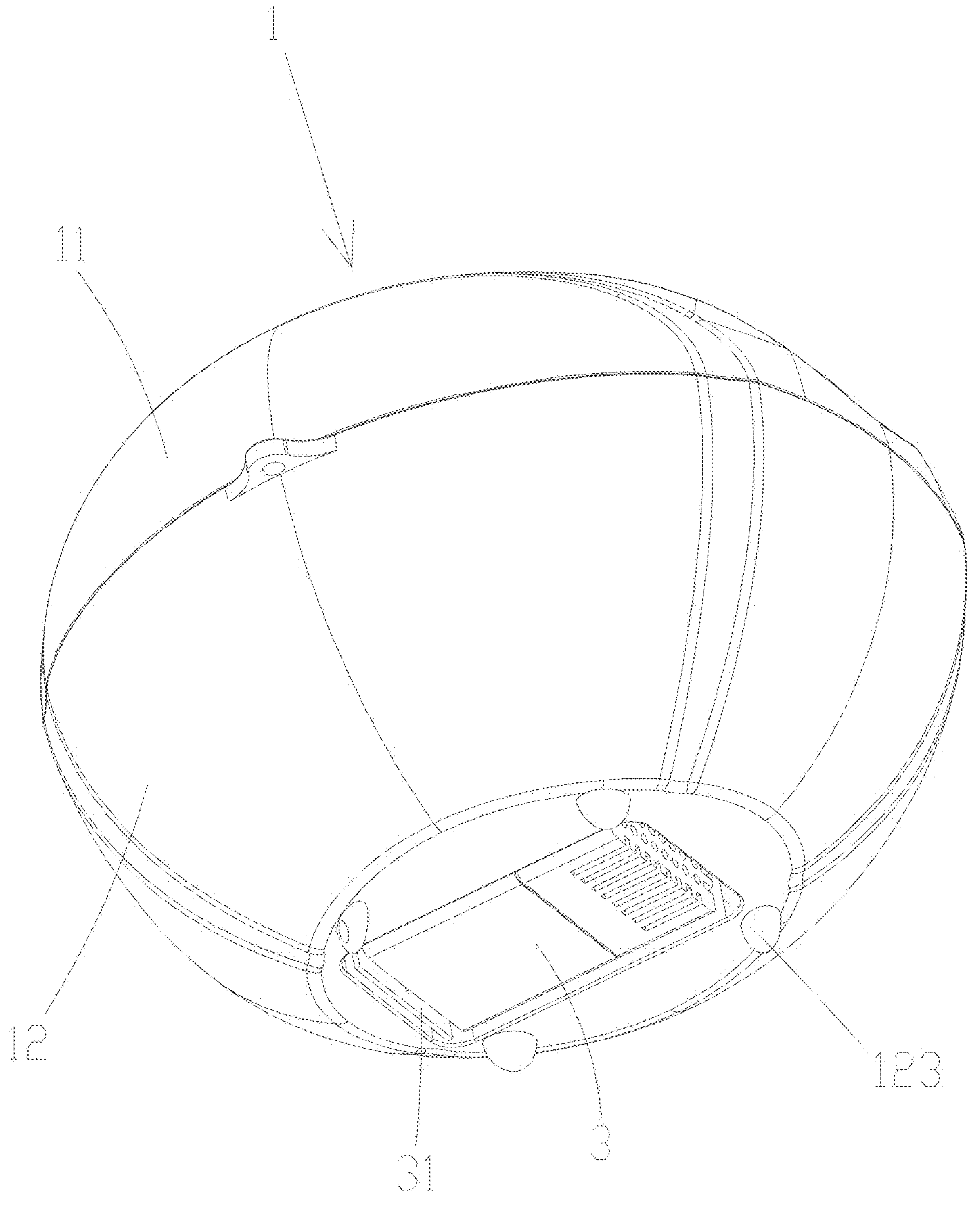
FIG. 2 is another perspective view of the embodiment 1, embodiment 2 and embodiment 3 of the present invention.
Figure 3:
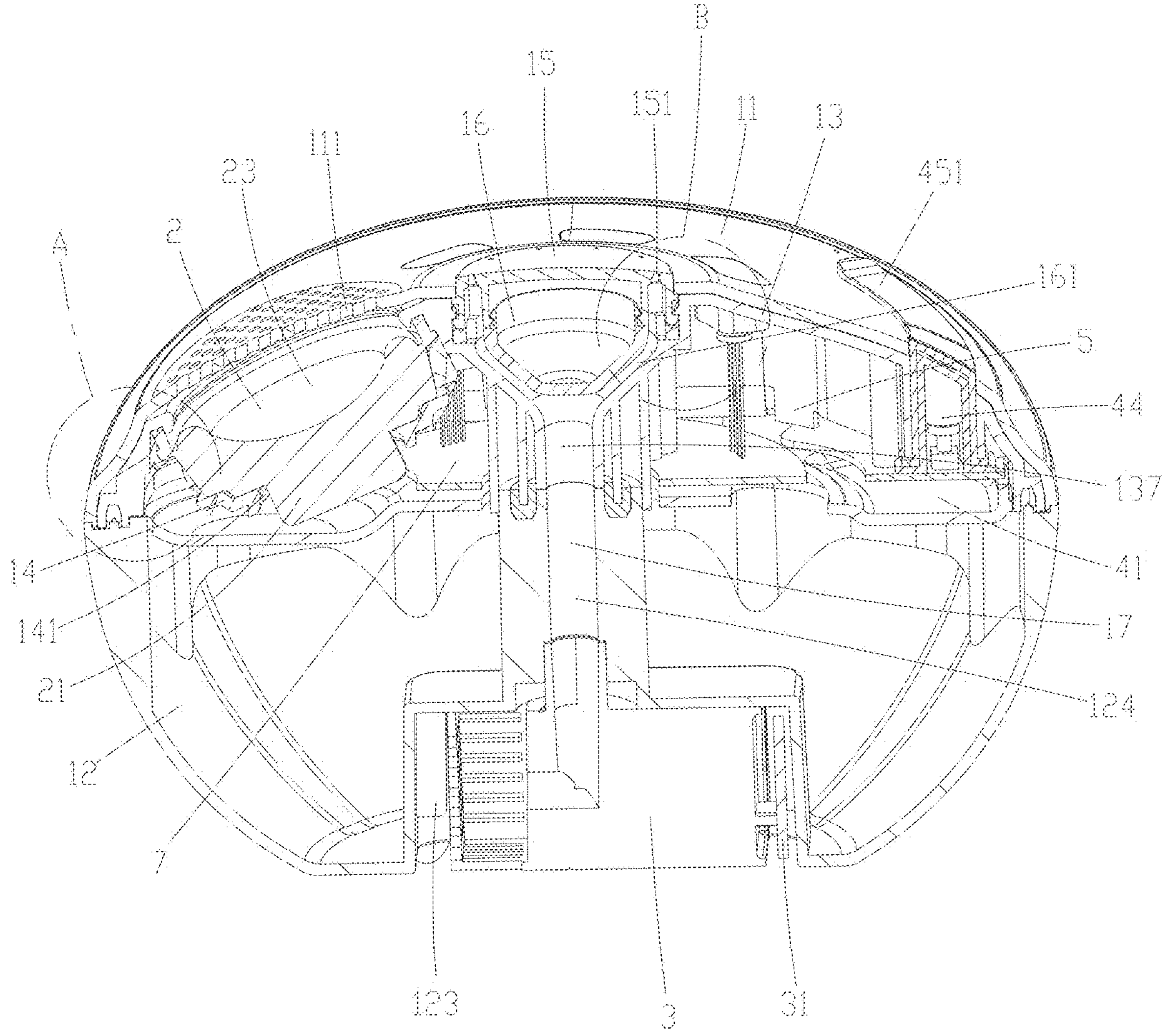
FIG. 3 is a section view of the embodiment 1, embodiment 2 and embodiment 3 of the present invention.
Figure 4:
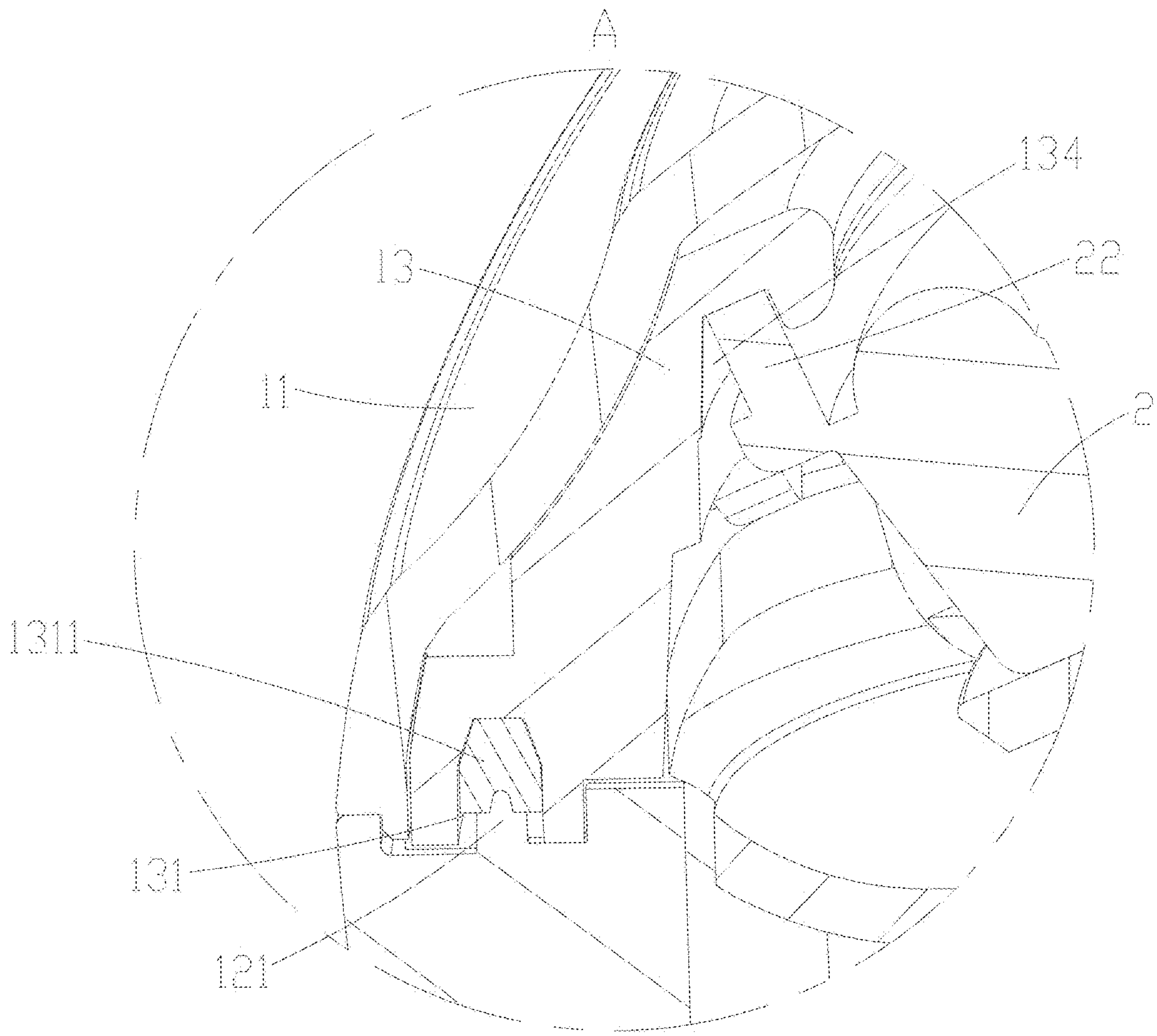
FIG. 4 is an enlarged view of area A in FIG. 3.
Figure 5:
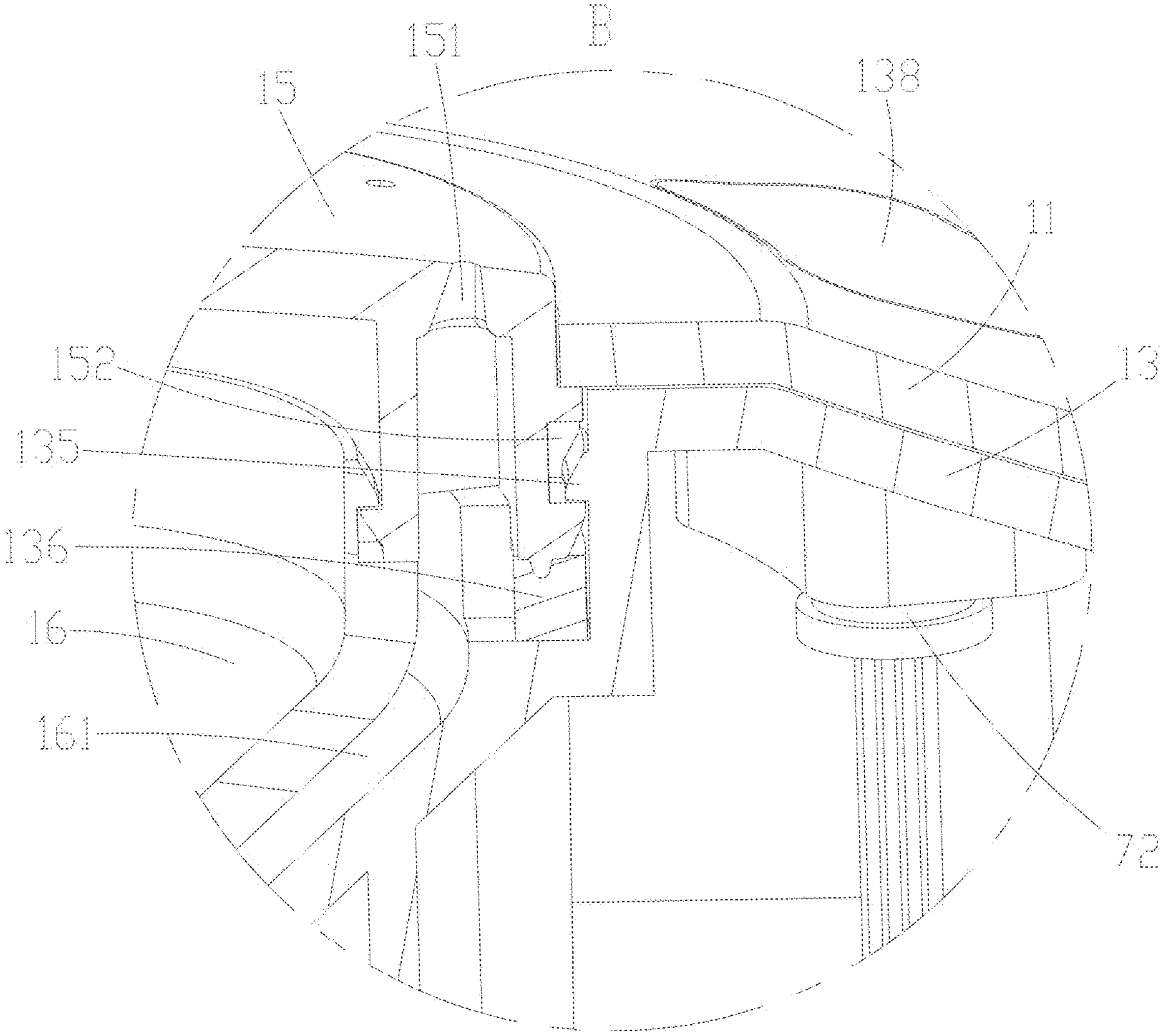
FIG. 5 is an enlarged view of area B in FIG. 3.
Figure 6:
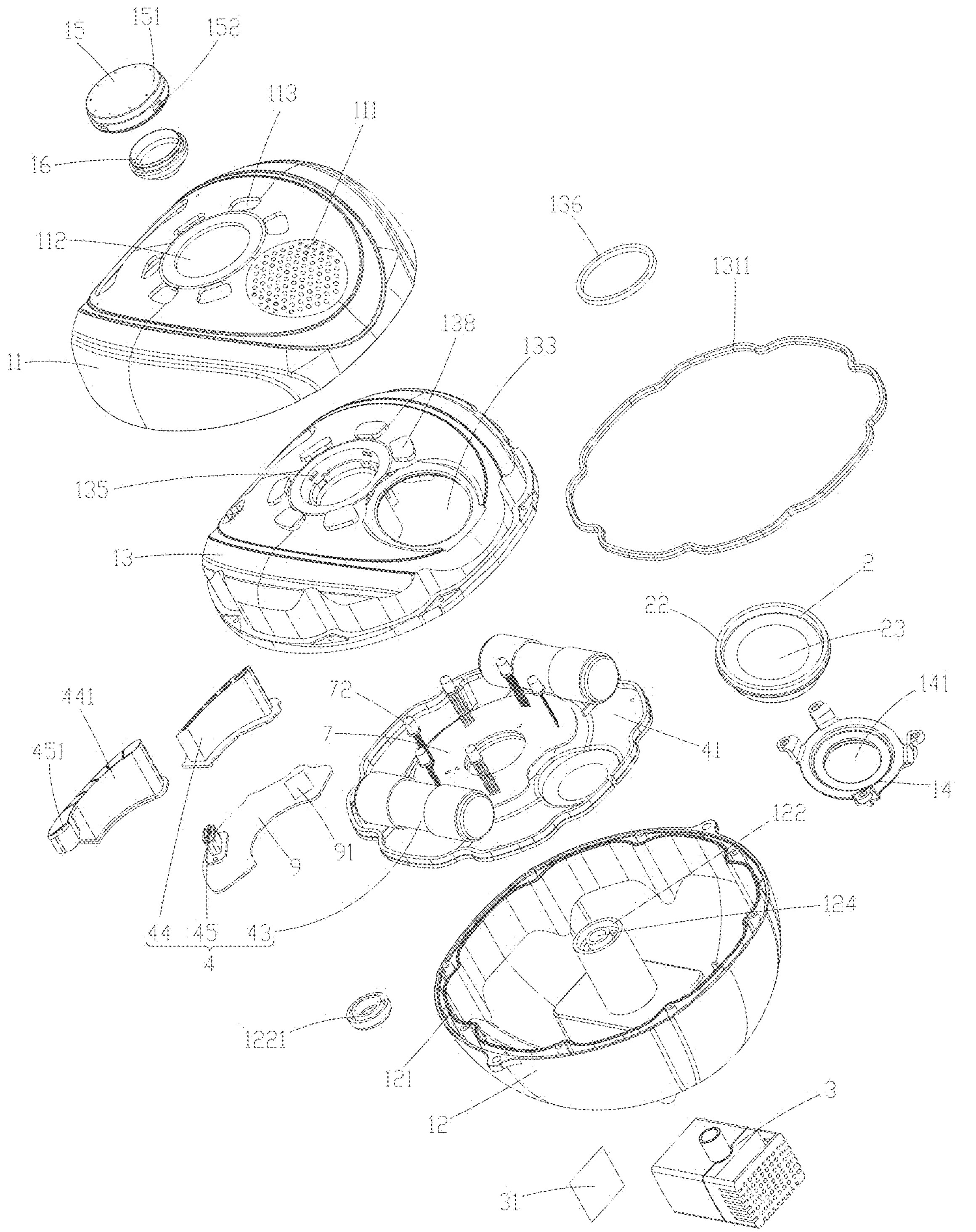
FIG. 6 is an exploded view of the embodiment 1, embodiment 2 and embodiment 3 of the present invention.
Figure 7:
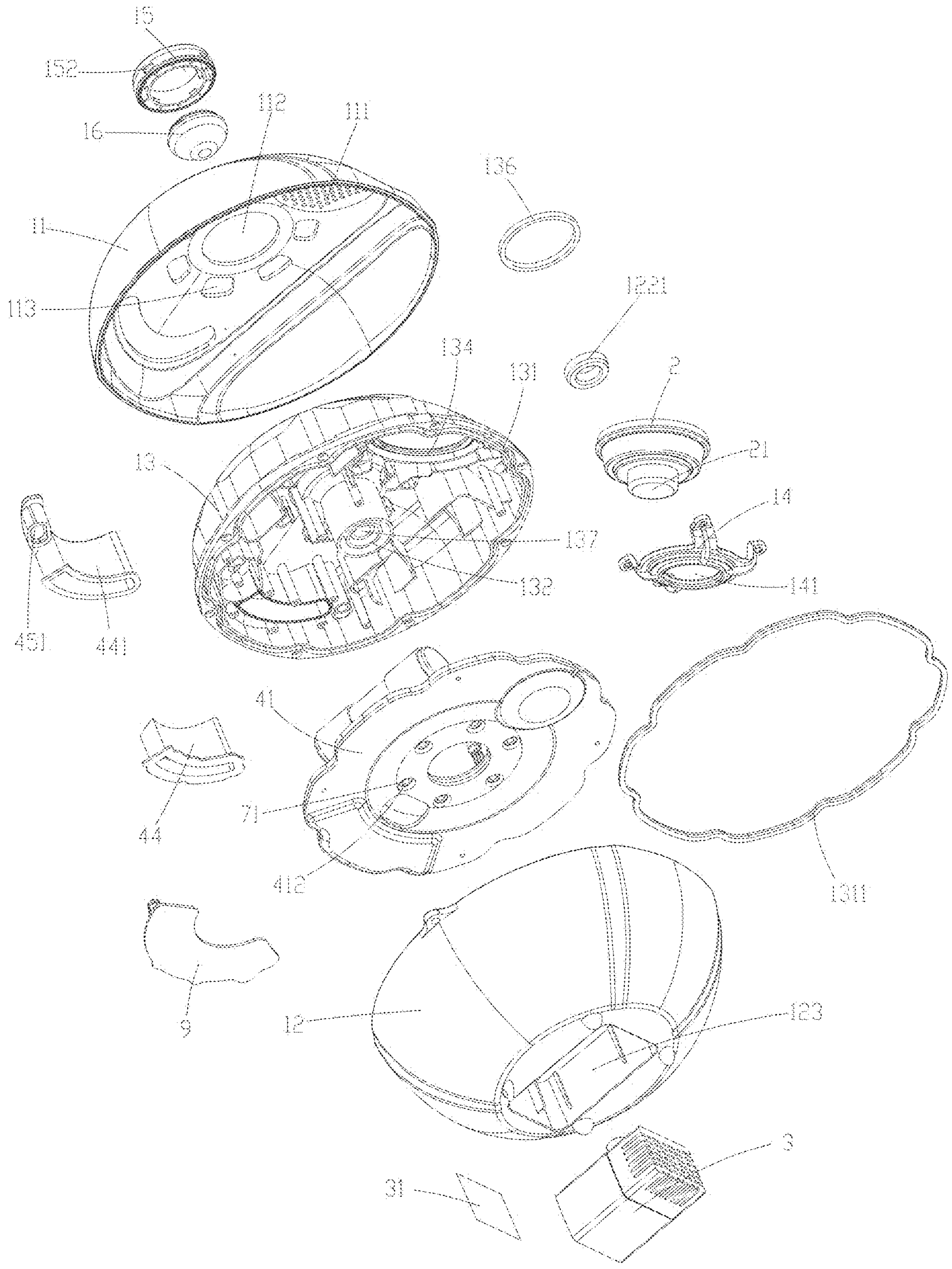
FIG. 7 is another exploded view of the embodiment 1, embodiment 2 and embodiment 3 of the present invention.
Figure 8:
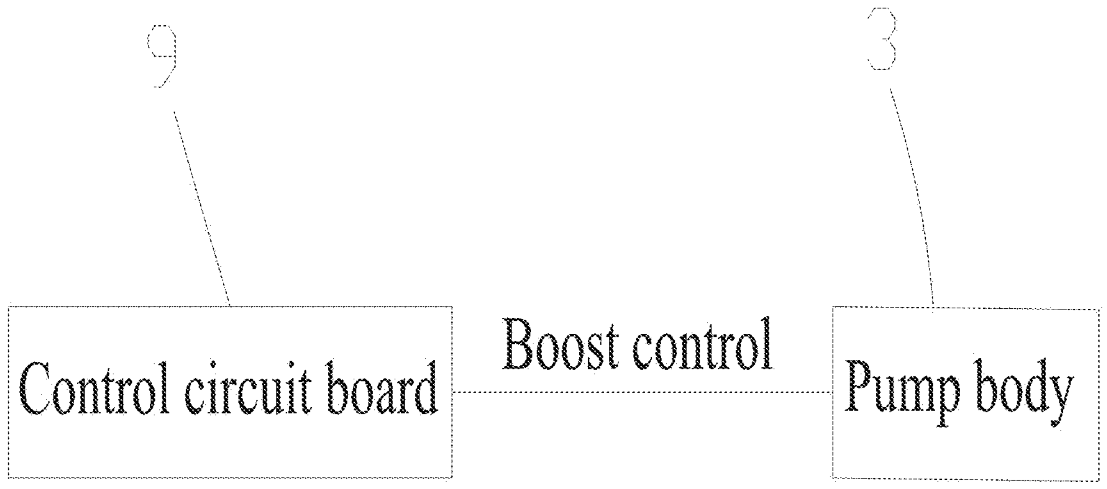
FIG. 8 is a block diagram of the present invention.
Figure 9:
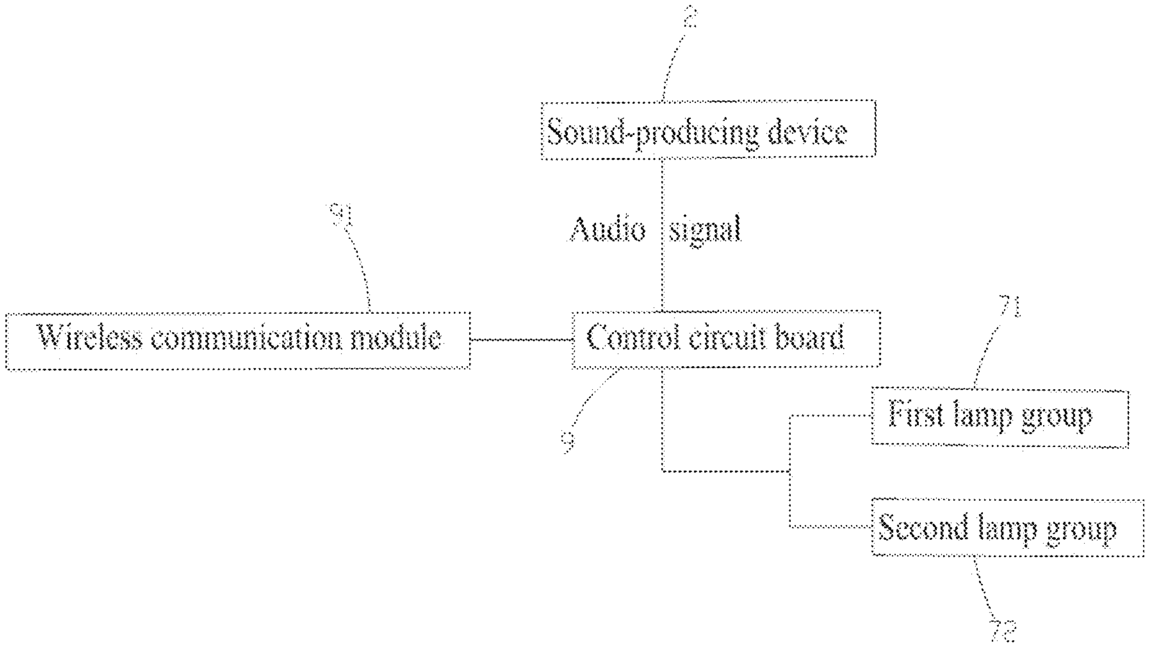
FIG. 9 is another block diagram of the present invention.
Figure 10:
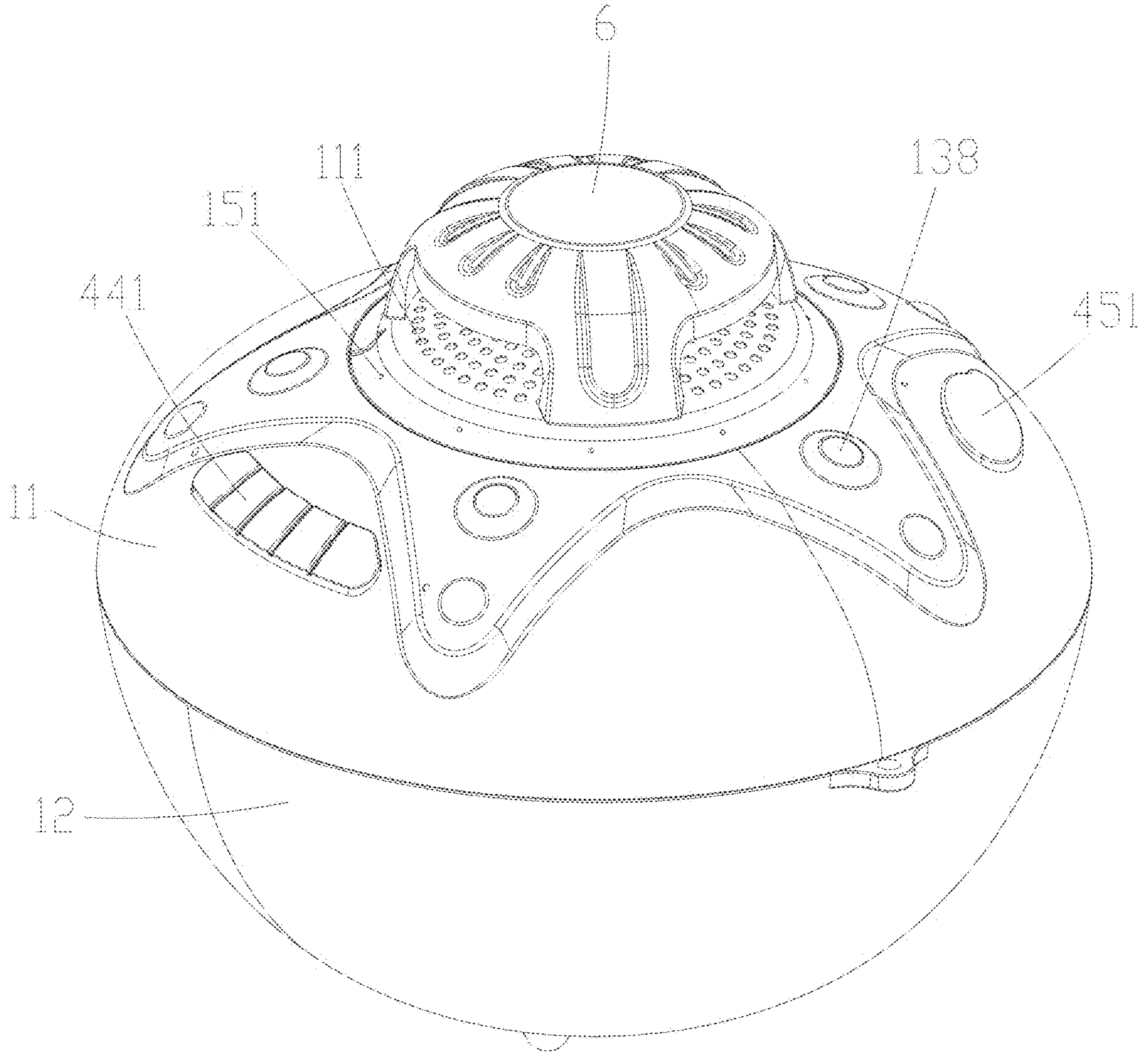
FIG. 10 is a perspective view of the embodiment 4 of the present invention.
Figure 11:
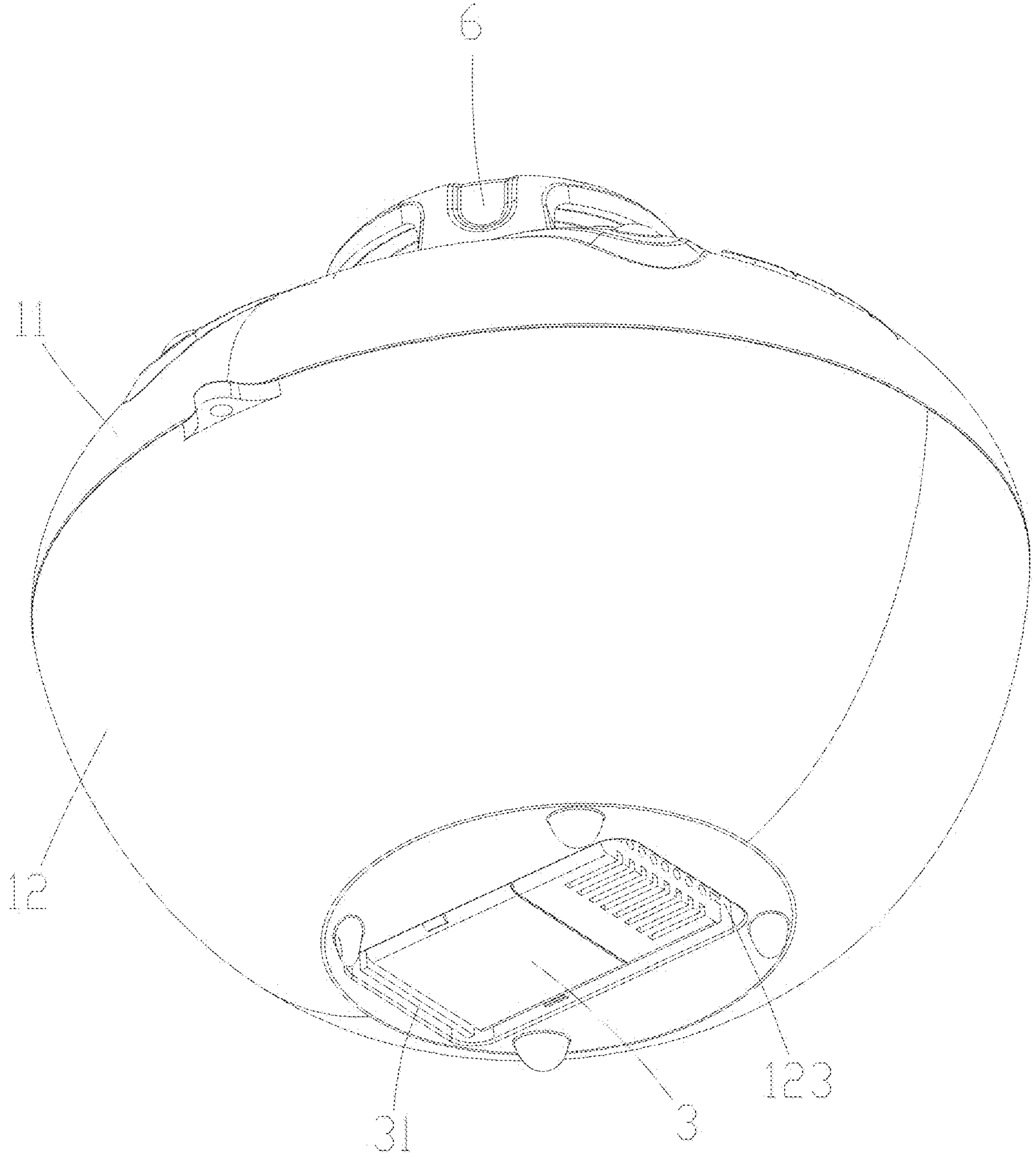
FIG. 11 is another perspective view of the embodiment 4 of the present invention.
Figure 12:
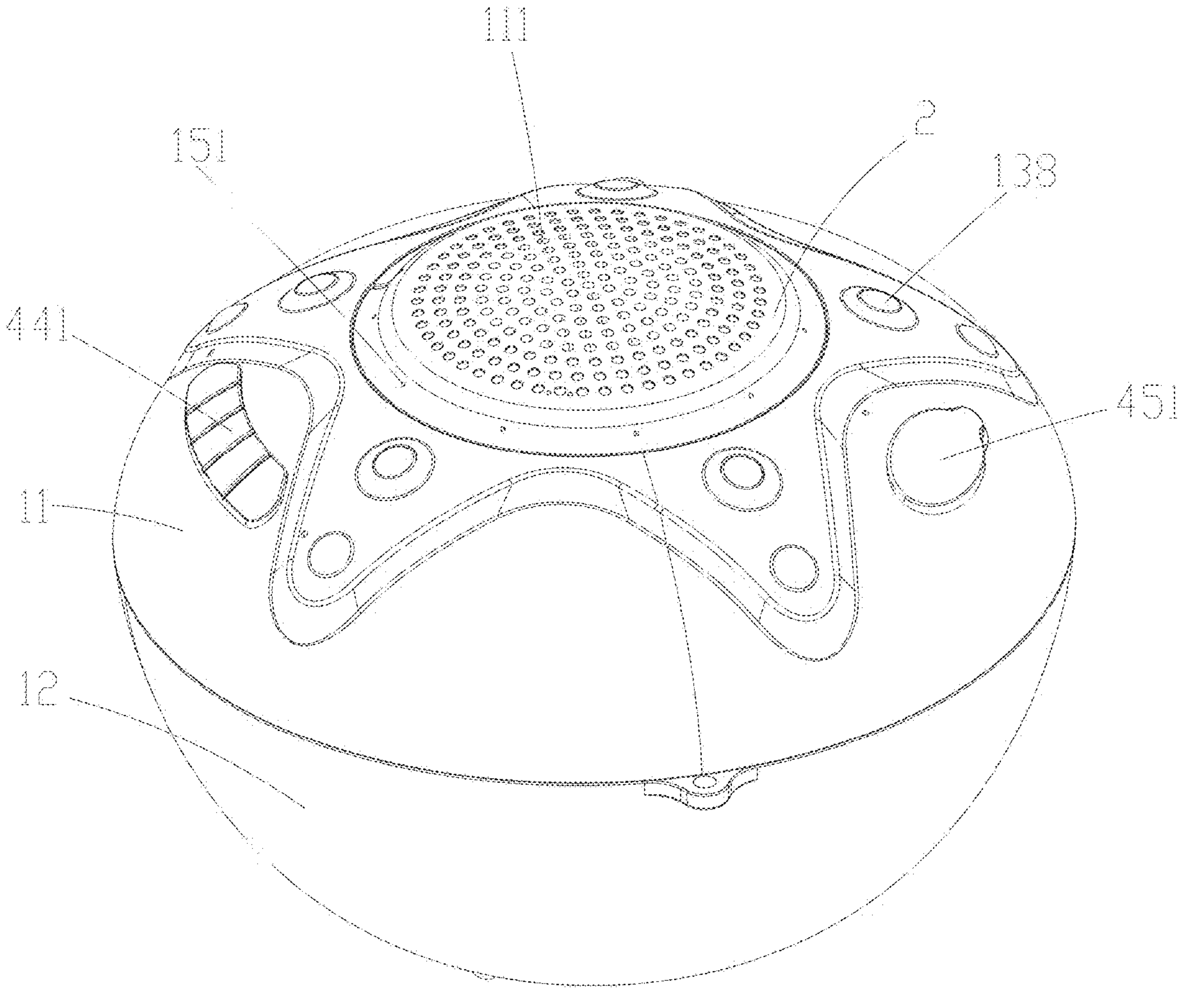
FIG. 12 is a perspective view of the embodiment 5 of the present invention.
Figure 13:
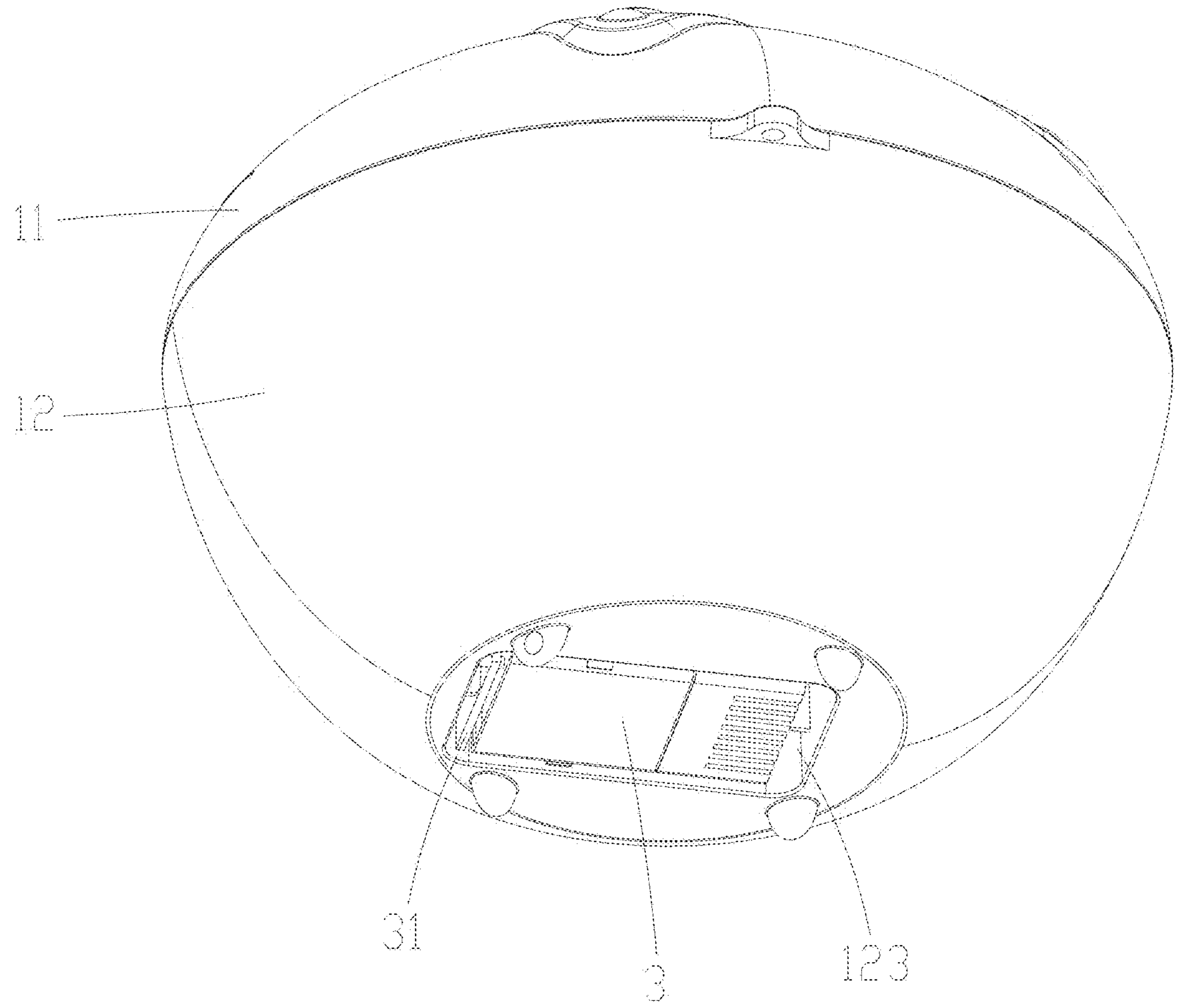
FIG. 13 is another perspective view of the embodiment 5 of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Embodiment 1

A swimming pool fountain speaker, includes:

- an outer housing 1, the outer housing 1 being configured for floating on the water surface;
- a sound-producing device 2, the sound-producing device 2 being arranged in the outer housing 1, and the sound-producing device 2 being configured for playing audio; and
- a power supply system 4 and a control circuit board 9, and the power supply system 4 being configured for supplying power to the sound-producing device 2.

The control circuit board 9 is electrically connected to the sound-producing device 2. The control circuit board 9 includes a wireless communication module 91. The control circuit board 9 is configured for receiving a wireless signal via the wireless communication module 91, and the control circuit board 9 is configured for controlling the sound-producing device 2 to play audio.

Through the above structure, an outermost side of the swimming pool fountain speaker is provided with the outer housing 1. The outer housing 1 can enable the swimming pool fountain speaker to float in the water through buoyancy. The swimming pool fountain speaker further includes the sound-producing device 2, and the sound-producing device 2 is configured for playing audio. The swimming pool fountain speaker further includes the control circuit board 9, and the control circuit board 9 is electrically connected to the sound-producing device 2. The control circuit board 9 includes the wireless communication module 91, and the wireless communication module 91 is capable of receiving a wireless signal. The wireless signal is sent out by an external controller or an application on a mobile. After the control circuit board 9 receives the wireless signal via the wireless communication module 91, the sound-producing device 2 is controlled to play audio. In this way, users do not need to manually press a button to control the swimming pool fountain speaker to play music, and can instead control the swimming pool fountain speaker to play favorite music through wireless transmission, which provides great convenience for the users and improves the user experience.

In this embodiment, the outer housing 1 includes a first housing 11 and a second housing 12. The first housing 11 is connected to the second housing 12. The first housing 11 is positioned on a top side, and the second housing 12 is positioned on a bottom side. The first housing 11 is connected to the second housing 12 via a fastener. The swimming pool fountain speaker further includes an inner housing 13 and a bracket 14. The inner housing 13 is arranged in the outer housing 1, and the inner housing 13 is respectively connected to the first housing 11 and the second housing 12. An accommodating cavity 5 is formed by the inner housing 13 and the second housing 12. The sound-producing device 2 and the power supply system 4 are arranged in the accommodating cavity 5. The bracket 14 is arranged on the inner housing 13, and the sound-producing device 2 is arranged on the bracket 14. Through the above structure, the inner housing 13 and the second housing 12 are connected to form the accommodating cavity 5, and the sound-producing device 2 and the power supply system 4 are arranged in the accommodating cavity 5. The outer housing 1 is capable of protecting the sound-producing device 2 and the power supply system 4 from being damaged. The sound-producing device 2 is arranged on the bracket 14 positioned in an inner portion of the outer housing 1, so that the sound-producing device 2 is better fixed. Moreover, the design is simple, and the space is made full use of.

In this embodiment, the inner housing 13 includes a first slot 131, and the second housing 12 includes a first connection portion 121. The first connection portion 121 is configured to be arranged in the first slot 131, so that the second housing 12 is connected to the inner housing 13. Through the above structure, the first slot 131 is arranged around an edge of the inner housing 13, and the first connection portion 121 is arranged around an edge of the second housing 12. A size of the first connection portion 121 is matched with a size of the first slot 131. When the inner housing 13 and the second housing 12 are installed, the first connection portion 121 is engaged in the first slot 131, so that the connection between the inner housing 13 and the second housing 12 is more fixed. Preferably, the first slot 131 is provided with a first sealing member 1311. When the first connection portion 121 is engaged in the first slot 131, the first sealing member 1311 is compressed. This increases the sealing performance of the accommodating cavity 5, and the sealed accommodating cavity 5 is thereby formed.

In this embodiment, the first housing 11 includes a plurality of sound holes 111, and the sound-producing device 2 is arranged corresponding to the sound hole 111. The bracket 14 includes a first mounting hole 141, and a lower end of the sound-producing device includes a protrusion 21. The protrusion 21 is configured to be arranged in the first mounting hole 141, so that the sound-producing device 2 is arranged on the bracket 14. The inner housing 13 further includes a second mounting hole 133, and the sound-producing device 2 is arranged corresponding to the second mounting hole 133. Through the above structure, the plurality of sound holes 111 are arranged corresponding to a position of the sound-producing device 2. Thus, the sound emitted by the sound-producing device 2 can be better diffused to the outside through the sound holes 111. The bracket 14 is connected to the inner housing 13 through a fastener. The bracket 14 is provided with the first mounting hole 141, and the lower portion of the sound-producing device 2 is provided with the protrusion 21. The protrusion 21 is engaged in the first mounting hole 141, so that the sound-producing device 2 is more fixedly connected to the bracket 14. The inner housing 13 further includes the second mounting hole 133. The second mounting hole 133 is arranged corresponding to positions of the sound holes 111 and the sound-producing device 2, so that the sound emitted from the sound-producing device 2 is not blocked by the inner housing 13. Preferably, the sound-producing device 2 further includes a diaphragm 23, and the diaphragm 23 is arranged on a surface of the sound-producing device 2. The diaphragm 23 vibrates when the sound-producing device 2 emits the sound. If there is water on the surface of the sound-producing device 2, the vibration of the diaphragm 23 removes the water on the surface of the sound-producing device 2, so as to better protect the sound-producing device 2 from being damaged by the water.

In this embodiment, the inner housing 13 further includes a third slot 134, and the sound-producing device 2 further includes a third connection portion 22. The third connection portion 22 is configured to be arranged in the third slot 134, so that the sound-producing device 2 is connected to the inner housing 13. Through the above structure, the inner housing 13 is provided with the third slot 134, and the third slot 134 is arranged at an edge of the second mounting hole 133. An upper portion of the sound-producing device 2 is provided with the third connection portion 22. When the third connection portion 22 is engaged in the third slot 134, the sound-producing device 2 is more fixedly connected to the inner housing 13.

In this embodiment, the outer housing further includes a water spray channel 17 extending from top to bottom and a plurality of water outlets 151. The water spray channel 17 is in communication with the water outlets 151. The swimming pool fountain speaker further includes a pump body 3, and the power supply system 4 is electrically connected to the pump body 3. The pump body 3, the water spray channel 17 and the water outlets 151 are connected in sequence. The pump body 3 is configured for ejecting the water from the water outlets 151 after the water is pumped into the water spray channel 17 by the pump body 3 and flows through the water spray channel 17. A diameter of the water outlet 151 is smaller than a diameter of the water spray channel 17, so that the water in the water spray channel 17 obtains bigger water pressure when being ejected from the water outlets 151, thereby obtaining a bigger spray height. Through the above structure, after the pump body 3 pumps the water in a swimming pool into the swimming pool fountain speaker, the water pumped out flows through the water spray channel 17, and then the water is ejected from the water outlets 151. The diameter of the water outlet 151 is smaller than the diameter of the water spray channel 17. Thus, when the water flows from the water spray channel 17 through the water outlets 151, a certain water pressure builds up, so that the water flow velocity becomes faster, and the water ejected from the water outlets 151 reaches a certain height. Moreover, the arrangement of the plurality of water outlets 151 generates more water columns when the water is ejected, and the plurality of water columns are gathered together to form a fountain-like effect. Preferably, the second housing 12 includes an installation slot 123, and the pump body 3 is arranged in the installation slot 123. The installation slot 123 is arranged at a lowermost side of the second housing 12. The pump body 3 is embedded and installed in the installation slot 123, and a lowermost end of the pump body 3 is arranged to contact the water surface more effectively. The pump body 3 is embedded in the second housing 12, so that the appearance of the swimming pool fountain speaker appears neater.

In this embodiment, the outer housing 1 further includes a nozzle 15, and the plurality of water outlets 151 are arranged around the nozzle 15. The first housing 11 includes a third mounting hole 112. The nozzle 15 is arranged in the third mounting hole 112 and is connected to the inner housing 13. Through the above structure, the third mounting hole 112 is arranged on an upper surface of the first housing 11. The nozzle 15 is arranged in the third mounting hole 112, and the plurality of water outlets 151 are arranged around the nozzle 15. The water can be ejected from the water outlets 151, and the circumferentially arranged water outlets 151 can make the ejected water columns more regular and aesthetic. Specifically, the nozzle 15 includes a fourth slot 152, and the inner housing 13 further includes a fourth connection portion 135. The fourth connection portion 135 is configured to be arranged in the fourth slot 152, so that the inner housing 13 is connected to the nozzle 15. A third sealing member 136 is arranged between the inner housing 13 and the nozzle 15. Through the above structure, the fourth slot 152 is arranged on the nozzle 15, and the fourth connection portion 135 is arranged on the inner housing 13. The fourth connection portion 135 is engaged in the fourth slot 152, so that the inner housing 13 is more fixedly connected to the nozzle 15. Preferably, the third sealing member 136 is arranged between the inner housing 13 and the nozzle 15, which increases the sealing performance between the inner housing 13 and the nozzle 15.

In this embodiment, the water spray channel 17 includes a first channel 124, a second channel 137 and a third channel 161. The first channel 124 is defined in the second housing 12. The installation slot 123 at a bottom portion of the second housing 12 is in communication with the first channel 124. The second channel 137 is defined in the inner housing 13, and the first channel 124 is connected to and is in communication with the second channel 137. The outer housing 1 further includes a third housing 16, and the third housing 16 is connected to the nozzle 15. The third housing 16 is arranged in the second channel 137. A gap is positioned between the third housing 16 and an inner wall of the second channel 137, so that the third channel 161 is formed. The third channel 161 is arranged around the third housing 16, and the third channel 161 is in communication with the water outlets 151. A diameter of the third channel 161 is smaller than a diameter of the second channel 137. Through the above structure, the installation slot 123, the first channel 124, the second channel 137, the third channel 161 and the water outlets 151 are sequentially in communication. After the water pumped by the pump body 3 flows through the first channel 124, the second channel 137 and the third channel 161, the water is ejected from the water outlets 151. The diameter of the third channel 161 is smaller than the diameter of the second channel 137. Thus, when the water flows from the second channel 137 with a larger diameter to the third channel 161 with a smaller diameter, water pressure builds up, so that the water in the third channel 161 flows faster. Preferably, the second housing 12 further includes a second slot 122, and the inner housing 13 further includes a second connection portion 132. The second connection portion 132 is configured to be arranged in the second slot 122, so that the second housing 12 is connected to the inner housing 13. Through the above structure, the second slot 122 is arranged around the first channel 124, and the second connection portion 132 is arranged around the second channel 137. The second connection portion 132 is engaged in the second slot 122, so that the second housing 12 is more fixedly connected to the inner housing 13. Preferably, the second slot 122 is provided with a second sealing member 1221. The second connection portion 132 is engaged in the second slot 122 and configured for compressing the second sealing member 1221. This increases the sealing performance between the first channel 124 and the second channel 137, and also the sealing performance of the accommodating cavity 5. Preferably, a second lamp group 72 is capable of illuminating the water ejected from the water outlets 151, and the lighting effect of the second lamp group 72 is in combination with the water ejected from the water outlets 151, which brings better visual experience to the users.

In this embodiment, the swimming pool fountain speaker further includes a water sensing device 31. The water sensing device 31 is arranged at a bottom portion of the swimming pool fountain speaker. The water sensing device 31 is electrically connected to the control circuit board 9. When the swimming pool fountain speaker is placed in water, the water sensing device 31 generates a water ingress signal after contacting water. After receiving the water ingress signal, the control circuit board 9 controls the swimming pool fountain speaker to automatically spray water, automatically play music and automatically illuminate, thereby improving the user experience.

In this embodiment, the pump body 3 is provided with a first working mode and a second working mode. When the pump body 3 is in the first working mode, a power of the pump body 3 is a first power, and a spray height of the water outlet 151 is a first spray height. When the pump body 3 is in the second working mode, the power of the pump body 3 is a second power, and the spray height of the water outlet 151 is a second spray height. The second spray height is greater than the first spray height. Preferably, a third working mode is preset in the swimming pool fountain speaker. When in the third working mode, the sound-producing device 2 generates an audio signal while playing audio, and the audio signal is transmitted to the control circuit board 9. The control circuit board 9 is configured for controlling the power of the pump body 3 to change in accordance with the audio signal according to the received audio signal, so that the spray height of the water outlet 151 changes in accordance with the audio signal. Specifically, if the sound-producing device 2 generates a high-frequency audio signal while playing audio, the power of the pump body 3 is greater, and the water spray height of the corresponding water outlet 151 gets higher. Conversely, if the sound-producing device 2 generates a low-frequency audio signal while playing audio, the power of the pump body 3 is smaller, and the water spray height of the corresponding water outlet 151 gets lower. In another configuration, when the sound-producing device 2 generates a high-frequency audio signal while playing audio, the power of the pump body 3 is smaller, and the water spray height of the corresponding water outlet 151 is lower. If the sound-producing device 2 generates a low-frequency audio signal while playing audio, the power of the pump body 3 is greater, and the water spray height of the corresponding water outlet 151 is higher. Thus, the swimming pool fountain speaker is provided with a plurality of water spray heights, thereby providing users with more selectivity and enjoyment.

In this embodiment, the swimming pool fountain speaker further includes a lighting device 7. The lighting device 7 is electrically connected to the power supply system 4, and the lighting device 7 is arranged in the outer housing 1. The lighting device 7 is capable of emitting a plurality of colorful lights. The sound-producing device 2 is configured for emitting an audio signal while playing audio. After receiving the audio signal, the control circuit board 9 controls the lighting device 7 to flash in accordance with the audio signal. Through the above structure, the light emitted by the lighting device 7 can illuminate the outside through the housing 1, so as to provide a lighting effect for the swimming pool fountain speaker. Specifically, the lighting device 7 can emit a variety of colorful light, and the lighting effect is colorful. The sound-producing device 2 generates the audio signal while playing audio. After receiving the audio signal, the control circuit board 9 controls the lighting device 7 to flash in accordance with the audio signal, so as to achieve the effect of synchronization with the musical rhythm.

In this embodiment, the lighting device 7 includes a first lamp group 71 and a second lamp group 72. The first lamp group 71 is arranged downwards, and the second lamp group 72 is arranged upwards. The second housing 12 is made of light pervious material. The first housing 11 further includes a fourth mounting hole 113. The inner housing 13 further includes a protruding lampshade 138. The lampshade 138 is arranged in the fourth mounting hole 113, and the second lamp group 72 is arranged corresponding to the lampshade 138. Through the above structure, the first lamp group 71 is arranged downwards, and the second housing 12 at the lower side is made of light pervious material. In this way, the light emitted by the first lamp group 71 can illuminate into the water through the second housing 12, thereby improving the ornamental value and user experience. The first housing 11 is provided with a plurality fourth mounting holes 113. The inner housing 13 is provided with the plurality of protruding lampshades 138. The lampshade 138 is engaged in the fourth mounting hole 113, and the second lamp group 72 is arranged facing the lampshade 138. Thus, the light emitted by the second lamp group 72 can illuminate an upper portion through the lampshades 138. The swimming pool fountain speaker can emit light to illuminate the upper portion and also illuminate the water, so as to provide users with more interest and ornamental value.

In this embodiment, the swimming pool fountain speaker further includes a partition plate 41. The partition plate 41 is connected to the inner housing 13. The lighting device 7 and the power supply system 4 are arranged on the partition plate 41. The partition plate 14 includes a plurality of lamp holes 412, and a position of the lamp hole 412 corresponds to a position of the first lamp group 71. Through the above structure, the partition plate 41 is arranged in an inner potion of the swimming pool fountain speaker. The partition plate 41 is connected to the inner housing 13. The lighting device 7 is arranged on the partition plate 41. The partition plate 41 is provided with the plurality of lamp holes 412, and the position of the lamp hole 412 corresponds to the position of the first lamp group 71. In this way, the light emitted from the first lamp group 71 can pass through the partition plate 41.

In this embodiment, the power supply system 4 includes a battery 43, a control button 44 and a charging port 45. The control circuit board 9 is electrically connected to the control button 44, the charging port 45, the battery 43 and the pump body 3 respectively. The control button 44 includes a silicone sleeve 441, and the charging port 45 includes a waterproof plug 451. Through the above structure, the battery 43 includes two batteries. The two batteries 43 provide more power for the swimming pool fountain speaker, which extends the usage time and enhances user experience. Meanwhile, the two batteries 43 are arranged separately at two opposite ends of the partition plate 41, so as to increase the balance of the swimming pool fountain speaker. Preferably, the charging port 45 can be a commonly-used charging interface, such as USB (Universal Serial Bus), Type-C, etc., which makes it convenient for users to charge. Preferably, the charging port 45 includes the waterproof plug 451. The waterproof plug 451 is inserted into the charging port 45, which can increase the waterproofness of the charging port 45. The users can use the control button 44 to control the start and stop of the swimming pool fountain speaker, switch the water spray height, play music, and switch lighting modes. Preferably, the control button 44 includes the silicone sleeve 441, and the silicone sleeve 441 wraps the control button 44, thereby increasing the waterproofness of the control button 44.

Embodiment 2

A swimming pool fountain speaker, includes:

an outer housing 1, the outer housing 1 being configured for floating on the water surface, and the outer housing 1 including a water outlet 151;

a sound-producing device 2, the sound-producing device 2 being arranged in the outer housing 1, and the sound-producing device 2 being configured for playing audio;

a pump body 3, a power supply system 4 and a control circuit board 9, the power supply system 4 being configured for supplying power to the sound-producing device 2 and the pump body 3, and the pump body 3 being configured for pumping water into the swimming pool fountain speaker and discharging the water from the water outlet 151.

The control circuit board 9 is electrically connected to the sound-producing device 2. The control circuit board 9 includes a wireless communication module 91. The control circuit board 9 is configured for receiving a wireless signal via the wireless communication module 91, and the control circuit board 9 is configured for controlling the sound-producing device 2 to play audio.

Compared with the embodiment 1, in the embodiment 2, the swimming pool fountain speaker is further provided with the pump body 3, an installation slot 123, a first channel 124, a second channel 137, a third channel 161 and water outlets 151. The swimming pool fountain speaker has a water spraying function, and the water spray height of the water outlet can synchronize with the musical rhythm played by the sound-producing device 2. The addition of the water spraying function can bring users more playing methods and a better experience.

Embodiment 3

A swimming pool fountain speaker, includes:

an outer housing 1, the outer housing 1 being configured for floating on the water surface;

a sound-producing device 2, the sound-producing device 2 being arranged in the outer housing 1, and the sound-producing device 2 being configured for playing audio;

a power supply system 4, a lighting device 7 and a control circuit board 9, the power supply system 4 being configured for supplying power to the sound-producing device 2 and the lighting device 7, and the lighting device 7 being configured for illuminating the emitted light to the outside through the outer housing 1.

The control circuit board 9 is electrically connected to the sound-producing device 2. The control circuit board 9 includes a wireless communication module 91. The control circuit board 9 is configured for receiving a wireless signal via the wireless communication module 91, and the control circuit board 9 is configured for controlling the sound-producing device 2 to play audio.

Compared with the embodiment 1, in the embodiment 3, the swimming pool fountain speaker is further equipped with the lighting device 7. The lighting device 7 includes a first lamp group 71 and a second lamp group 72. The first lamp group 71 is arranged downwards, and the second lamp group 72 is arranged upwards. The first lamp group 71 is capable of illuminating the water, and the second lamp group 72 is capable of illuminating upwards. Moreover, the light emitted by the first lamp group 71 and the second lamp group 72 can synchronize with the rhythm of the music played by the sound-producing device 2, thereby bringing users a cooler visual experience.

Embodiment 4

Compared with the embodiment 1, in the embodiment 4, the swimming pool fountain speaker is further equipped with a top cover 6. The top cover 6 is arranged on the sound-producing device 2. The top cover 6 is capable of covering part of the sound holes 111, which functions to block water and prevents water from falling into the sound holes 111 to damage the sound-producing device 2. A certain distance is provided between the top cover 6 and the outer housing 1. The sound emitted by the sound-producing device 2 produces a more pleasant auditory effect after being reflected by the top cover 6, thereby enhancing the user experience.

Embodiment 5

Compared with the embodiment 4, in the embodiment 5, the top cover 6 is removed, and the water outlets 151 are arranged around the sound-producing device 2. In this way, the appearance design of the entire swimming pool fountain speaker is made to be more symmetrical and neater. Moreover, without the top cover 6, a volume of the entire swimming pool fountain speaker is reduced, so as to save the production and transportation costs.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A swimming pool fountain speaker, comprising:

an outer housing, the outer housing being configured for floating on the water surface;

a sound-producing device, the sound-producing device being arranged in the outer housing, and the sound-producing device being configured for playing audio;

a power supply system and a control circuit board, wherein the power supply system is electrically connected to the control circuit board, and the power supply system is configured for supplying power to the sound-producing device; the control circuit board is electrically connected to the sound-producing device, the control circuit board comprises a wireless communication module, the control circuit board is configured for receiving a wireless signal via the wireless communication module, and the control circuit board is configured for controlling the sound-producing device to play audio according to the received wireless signal;

wherein the outer housing comprises a first housing and a second housing, the first housing is connected to the second housing, and the second housing is configured for floating in the water; the swimming pool fountain speaker further comprises an inner housing and a bracket, the inner housing is arranged in the outer housing, the inner housing is respectively connected to the first housing and the second housing, an accommodating cavity is formed by the inner housing and the second housing, and the sound-producing device and the power supply system are arranged in the accommodating cavity; the bracket is arranged on the inner housing, and the sound-producing device is arranged on the bracket.

2. The swimming pool fountain speaker according to claim 1, wherein the inner housing comprises a first slot, the second housing comprises a first connection portion, and the first connection portion is configured to be arranged in the first slot, so that the second housing is connected to the inner housing; the first slot is provided with a first sealing member, and the first connection portion is engaged in the first slot and configured for compressing the first sealing member to form a sealed accommodating cavity.

3. The swimming pool fountain speaker according to claim 1, wherein the second housing further comprises a second slot, the inner housing further comprises a second connection portion, and the second connection portion is configured to be arranged in the second slot, so that the second housing is connected to the inner housing; the second slot is provided with a second sealing member, the second connection portion is engaged in the second slot and configure for compressing the second sealing member to form a sealed accommodating cavity.

4. The swimming pool fountain speaker according to claim 1, wherein the first housing comprises a plurality of sound holes, and the sound-producing device is arranged corresponding to the sound hole; the bracket comprises a first mounting hole, a lower end of the sound-producing device comprises a protrusion, and the protrusion is configured to be arranged in the first mounting hole, so that the sound-producing device is arranged on the bracket; the inner housing further comprises a second mounting hole, and the sound-producing device is arranged corresponding to the second mounting hole.

5. The swimming pool fountain speaker according to claim 1, wherein the inner housing further comprises a third slot, the sound-producing device further comprises a third connection portion, and the third connection portion is configured to be arranged in the third slot, so that the sound-producing device is connected to the inner housing.

6. The swimming pool fountain speaker according to claim 1, wherein the sound-producing device further comprises a diaphragm, and the diaphragm is arranged on a surface of the sound-producing device.

7. A swimming pool fountain speaker, comprising:

an outer housing, the outer housing being configured for floating on the water surface;

a sound-producing device, the sound-producing device being arranged in the outer housing, and the sound-producing device being configured for playing audio;

a power supply system and a control circuit board, wherein the power supply system is electrically connected to the control circuit board, and the power supply system is configured for supplying power to the sound-producing device; the control circuit board is electrically connected to the sound-producing device, the control circuit board comprises a wireless communication module, the control circuit board is configured for receiving a wireless signal via the wireless communication module, and the control circuit board is configured for controlling the sound-producing device to play audio according to the received wireless signal;

wherein the outer housing comprises a first housing, a second housing and an inner housing, and an accommodating cavity is formed by the inner housing and the second housing; the outer housing further comprises a water spray channel extending from top to bottom and a plurality of water outlets, the water spray channel is in communication with the water outlets, the swimming pool fountain speaker further comprises a pump body, and the power supply system is electrically connected to the pump body; the pump body, the water spray channel and the water outlets are connected in sequence, the pump is configured for ejecting the water from the water outlets after the water is pumped into the water spray channel by the pump body and flows through the water spray channel; a diameter of the water outlet is smaller than a diameter of the water spray channel, so that the water in the water spray channel obtains bigger water pressure when being ejected from the water outlets, thereby obtaining a bigger spray height; the accommodating cavity is arranged around the water spray channel.

8. The swimming pool fountain speaker according to claim 7, wherein the outer housing further comprises a nozzle, and the plurality of water outlets are arranged around the nozzle; the first housing comprises a third mounting hole, and the nozzle is arranged in the third mounting hole and is connected to the inner housing; the second housing comprises an installation slot, and the pump body is arranged in the installation slot.

9. The swimming pool fountain speaker according to claim 8, wherein the nozzle comprises a fourth slot, the inner housing further comprises a fourth connection portion, and the fourth connection portion is configured to be arranged in the fourth slot, so that the inner housing is connected to the fourth slot; a third sealing member is arranged between the inner housing and the nozzle, and the fourth connection portion is engaged in the fourth slot and configured for compressing the third sealing member, to seal a gap between the nozzle and the inner housing.

10. The swimming pool fountain speaker according to claim 9, wherein the water spray channel comprises a first channel, a second channel and a third channel; the first channel is defined in the second housing, and the first channel is in communication with the installation slot.

11. The swimming pool fountain speaker according to claim 10, wherein the second channel is arranged in the inner housing, and the second channel is connected to and is in communication with the first channel; the second connection portion is arranged in the second channel, the second slot is arranged in the first channel, and the second sealing member is configured for sealing the gap between the second channel and the first channel, so that the accommodating cavity is divided from the first channel and the second channel.

12. The swimming pool fountain speaker according to claim 11, wherein the outer housing further comprises a third housing, the third housing is connected to the nozzle, the third housing is arranged in the second channel, and a gap is positioned between the third housing and an inner wall of the second channel of the inner housing, so that a third channel is formed between the third housing and the inner wall of the second channel; the third channel is arranged around the third housing, and the third channel is in communication with the water outlets; a diameter of the third channel is smaller than a diameter of the second channel.

13. The swimming pool fountain speaker according to claim 7, wherein the pump body is provided with a first working mode and a second working mode, when the pump body is in the first working mode, a power of the pump body is a first power, and a spray height of the water outlet is a first spray height; when the pump body is in the second working mode, the power of the pump body is a second power, the spray height of the water outlet is a second spray height, and the second spray height is greater than the first spray height.

14. The swimming pool fountain speaker according to claim 7, wherein the pump body is further provided with a third working mode, when pump body is in the third working mode, the sound-producing device is configured for generating an audio signal while playing audio, the audio signal is transmitted to the control circuit board, and the control circuit board is configured for controlling a power of the pump body to change in accordance with the audio signal according to the received audio signal, so that the spray height of the water outlet changes in accordance with the audio signal.

15. A swimming pool fountain speaker, comprising:

an outer housing, the outer housing being configured for floating on the water surface;

a sound-producing device, the sound-producing device being arranged in the outer housing, and the sound-producing device being configured for playing audio;

a power supply system and a control circuit board, wherein the power supply system is electrically connected to the control circuit board, and the power supply system is configured for supplying power to the sound-producing device; the control circuit board is electrically connected to the sound-producing device, the control circuit board comprises a wireless communication module, the control circuit board is configured for receiving a wireless signal via the wireless communication module, and the control circuit board is configured for controlling the sound-producing device to play audio according to the received wireless signal;

wherein the outer housing comprises a first housing, a second housing and an inner housing, the swimming pool fountain speaker further comprises a lighting device, the lighting device is electrically connected to the power supply system, and the lighting device is arranged in the outer housing; the lighting device is capable of emitting multiple colorful lights; the sound-producing device is configured for emitting sound while playing audio, and the control circuit board is configured for controlling the lighting device to flash in accordance with the audio signal according to the received audio signal.

16. The swimming pool fountain speaker according to claim 15, wherein the lighting device comprises a first lamp group and a second lamp group, the first lamp group is arranged downwards, and the second lamp group is arranged upwards; the second housing is made of light pervious material; the first housing further comprises a fourth mounting hole, the inner housing further comprises a protruding lampshade, the lampshade is arranged in the fourth mounting hole, and the second lamp group is arranged corresponding to the lampshade.

17. The swimming pool fountain speaker according to claim 16, wherein the swimming pool fountain speaker further comprises a partition plate, the partition plate is connected to the inner housing, and the lighting device and the power supply system are arranged on the partition plate; the partition plate comprises a plurality of lamp holes, and a position of the lamp hole corresponds to a position of the first lamp group; the power supply system comprises a battery, a control button and a charging port, and the control circuit board is electrically connected to the control button, the charging port, the battery and the pump body respectively; the control button comprises a silicone sleeve; the swimming pool fountain speaker further comprises a water sensing device, the water sensing device is arranged at a bottom portion of the swimming pool fountain speaker, and the water sensing device is electrically connected to the control circuit board; the charging port comprises a waterproof plug.

* * * * *